June 12, 1956    J. T. RUSH    2,749,561
APPARATUS WHEREIN A RECIPROCABLE CUT OFF DIE FEEDS
A SEVERED ARTICLE ONTO A ROTATING TAP
Filed Dec. 5, 1955    4 Sheets-Sheet 1

INVENTOR
JOHN T. RUSH

ATTY.

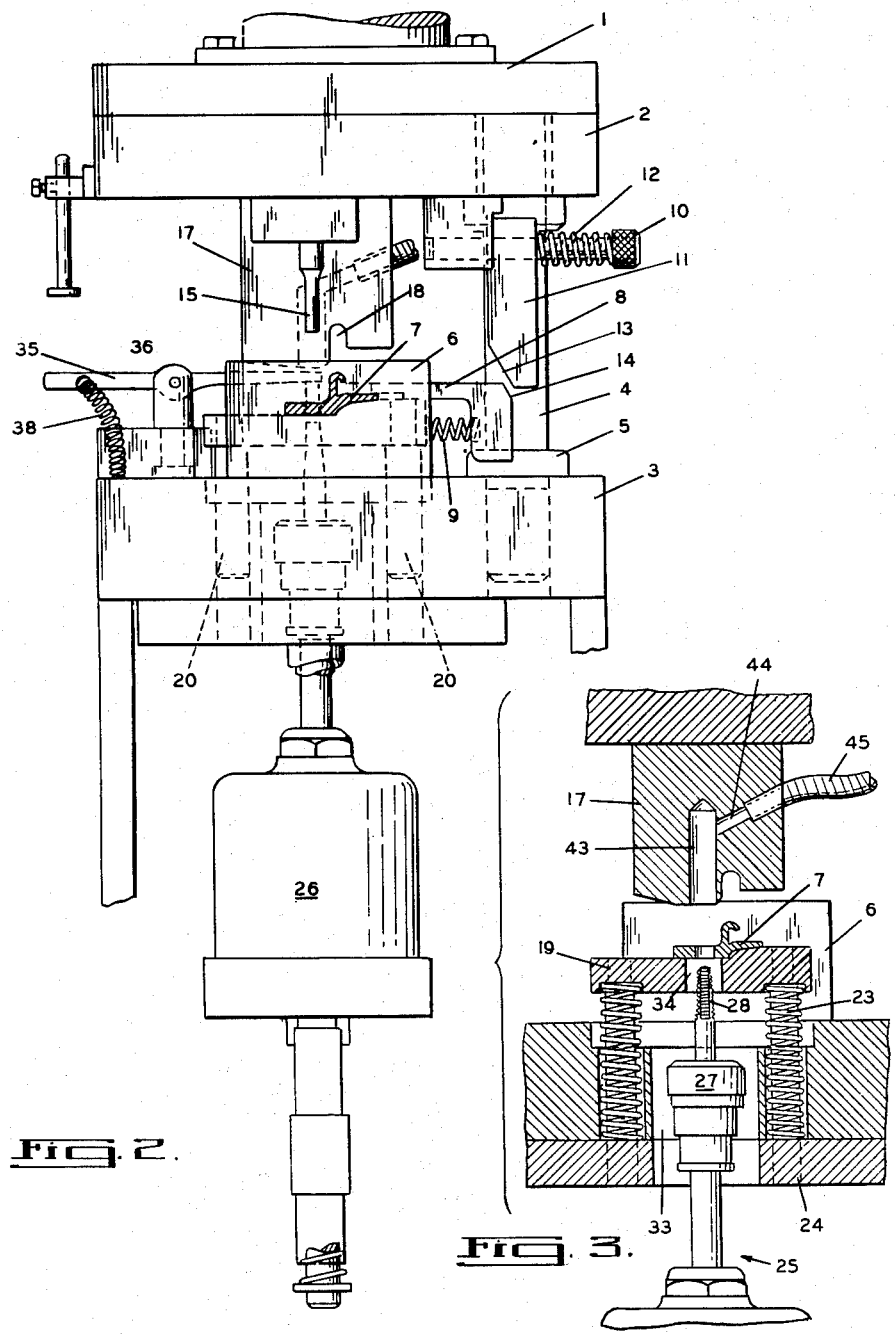

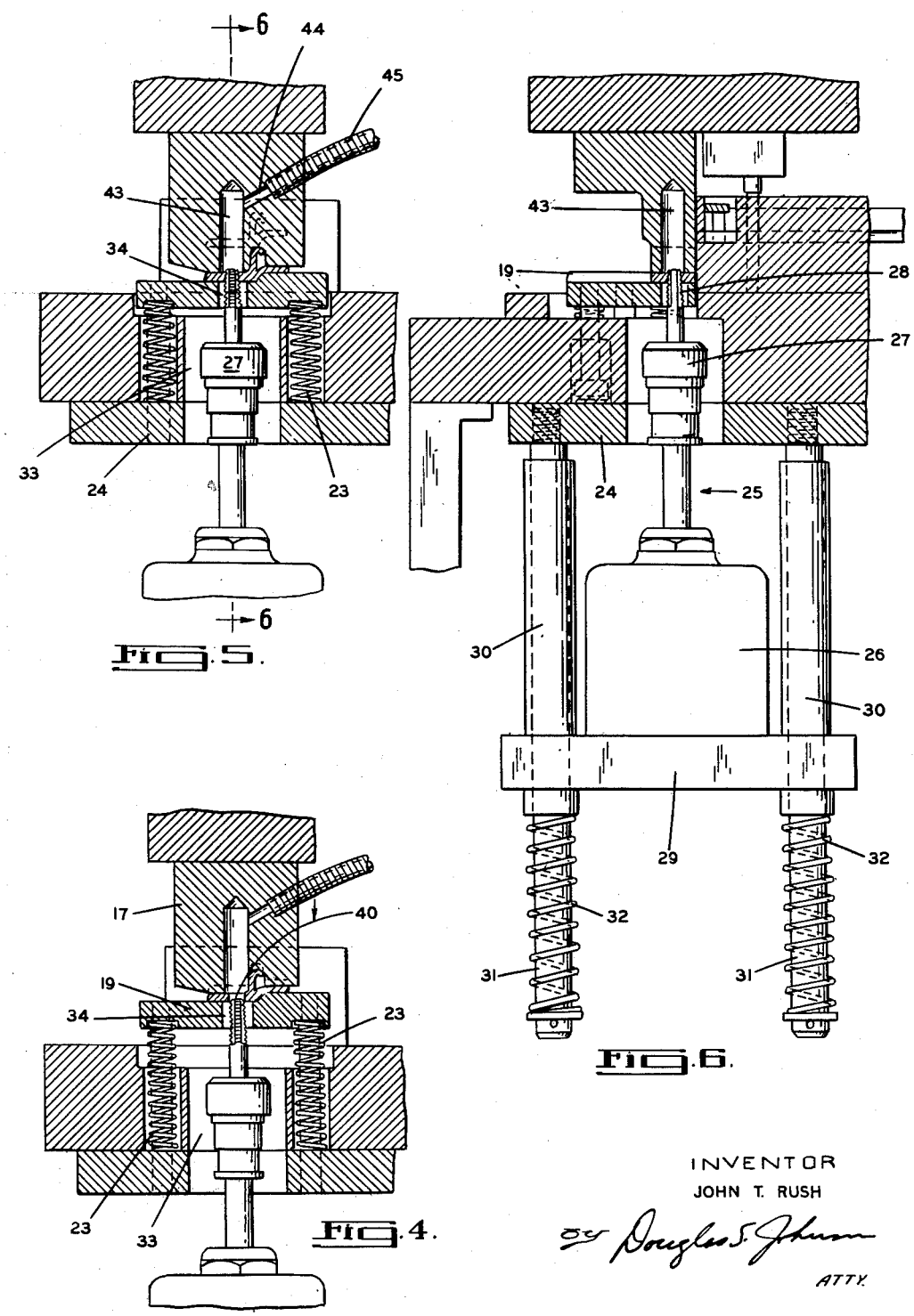

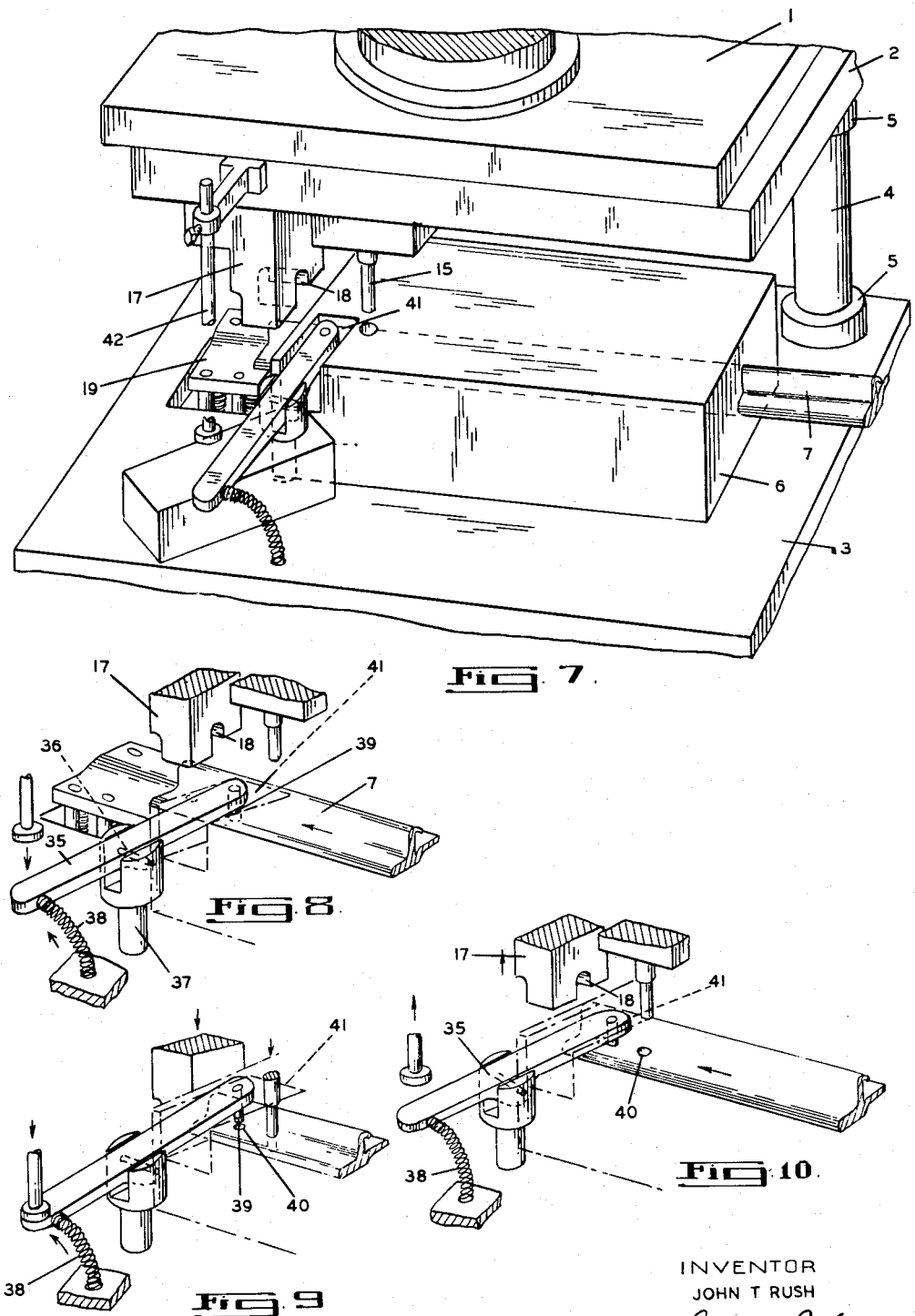

United States Patent Office 2,749,561
Patented June 12, 1956

2,749,561

APPARATUS WHEREIN A RECIPROCABLE CUT OFF DIE FEEDS A SEVERED ARTICLE ONTO A ROTATING TAP

John Thomas Rush, North York, Ontario, Canada, assignor to Associated Tool & Manufacturing Company Limited, Downsview, Ontario, Canada Application December 5, 1955, Serial No. 551,157

14 Claims. (Cl. 10—72)

This invention relates to improvements in the method and means of manufacturing tapped articles from a length of stock.

The object of the invention is to enable an article which has previously been perforated to be simultaneously cut off from a length of stock and threaded or tapped to eliminate a presently required operation and minimize handling of the article, thereby greatly increasing the speed and correspondingly reducing the cost of production.

Another important object is to enable piercing of an adjacent portion of the stock to be carried out in preparation for its subsequent cut off and tapping at the same time that the simultaneous cut off and tapping of stock is taking place so that one operation effectively completes the piercing, tapping and cut off.

More particularly, it is an object of the invention to enable the piercing, tapping and cut off of an article to be effected in a standard press on one operation of the press.

The principal feature of the invention resides in the synchronization of movement of a cut off die and a tapping tool so that the rate of feed of the tapping tool is synchronized with the speed of the cut off die as it shears the piece from the stock so that there will be no stripping of the threads being formed.

Another feature resides in synchronizing a piercing die with the cut off die so that an adjacent part of the stock is pierced simultaneously in preparation for its subsequent cut off and tapping.

More particularly, according to the invention a press is provided with a cut off die and a piercing die to operate simultaneously on the stroke of the press to operate on adjacent portions of a length of preformed stock, the cut off die moving against a retractible platform supporting the portion to be cut off, and a tapping tool is retractibly mounted beneath the retractible platform to operate through the platform on the piece being cut off, the speed of the tapping tool and its retractible mounting synchronizing tap advance to cut off die descent, and the rate of recovery of the retractible platform following withdrawal of the cut off die and the rate of recovery of the retractible tapping tool synchronizing the tap withdrawal to prevent thread stripping or tap damage.

Another important feature resides in providing means to clamp the stock during the piercing, cut off and tapping operation and to release the stock for feed immediately subsequently to such operation.

A further feature resides in providing in conjunction with the aforesaid apparatus means for controlling the stock feed.

These and other objects and features of the invention will become apparent from the following description taken in conjunction with the accompanying drawings in which:

Figure 2 is an elevational view partly broken away of the apparatus of Figure 1 taken at right angles to Figure 1 from the stock in-feed side.

Figure 3 is a vertical sectional view partly broken away, taken through the cut off and tapping station of the apparatus of Figure 1 on the line 3—3 of Figure 1, and showing the cut off die about to descend.

Figure 4 is a view similar to Figure 3 but showing the cut off die advanced to effect stock cut off and showing the commencement of the tapping operation.

Figure 5 is a view similar to Figures 3 and 4 showing further advancement of the cut off die and the completion of the tapping to the point where the tapping tool is about to be withdrawn.

Figure 6 is a vertical sectional detail on the line 6—6 of Figure 5.

Figure 7 is a fragmented perspective view of the apparatus of Figure 1 showing the piercing and cut off dies and in-feed trigger stop control.

Figures 8 to 10 are broken away perspective details of the stock in-feed trigger stop mechanism showing the sequence of its operation.

Figures 1, 11, 12:
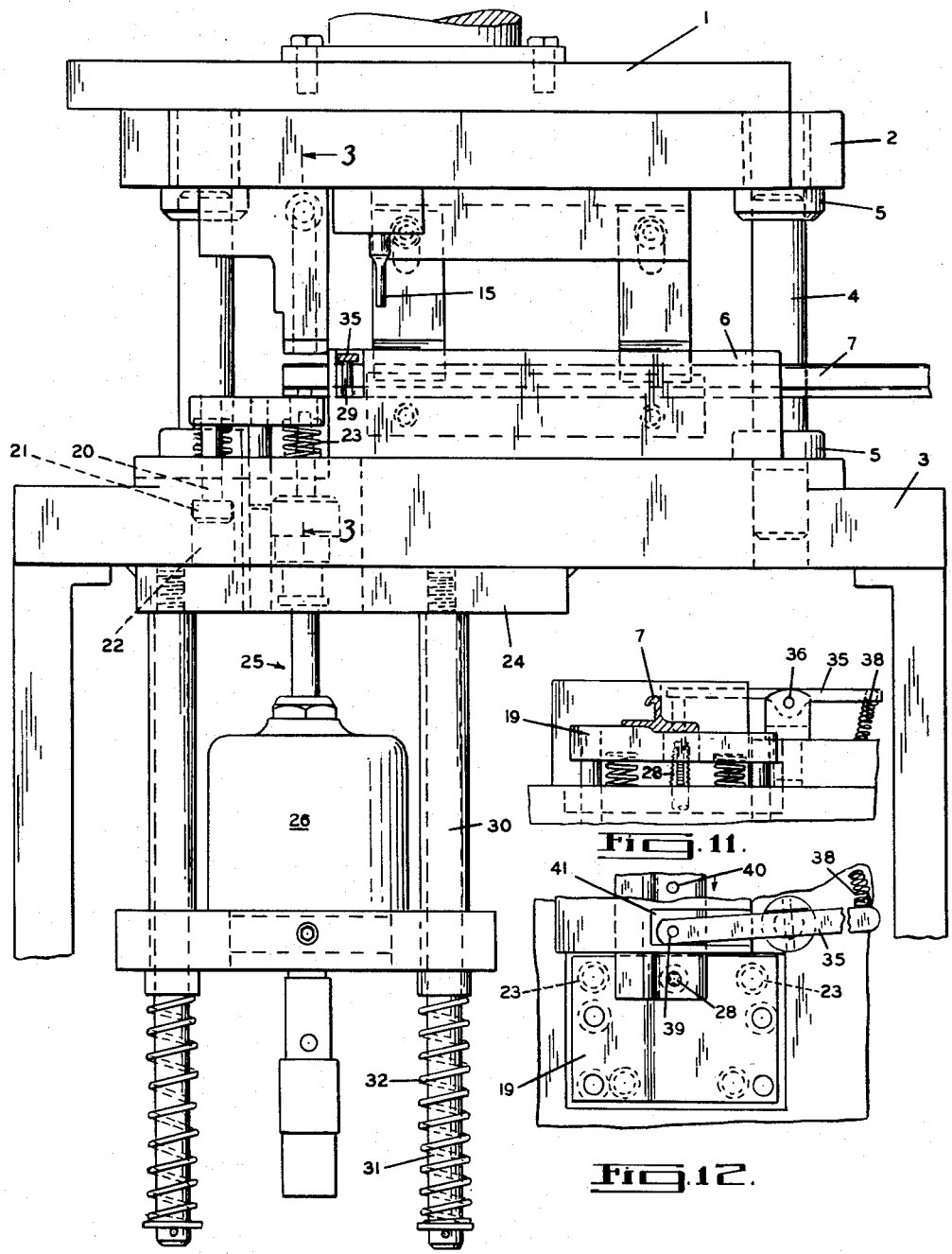
Figure 1 is a front elevational view, partially broken away, of an apparatus embodying the invention for simultaneously carrying out piercing, cut off and tapping operations on a piece of stock.
Figure 11 is an elevational view on a small scale taken from the opposite side of the apparatus from Figure 2, showing the reciprocating stock supporting platform at the cut off tapping station of the apparatus, the remainder of the apparatus being broken away.
Figure 12 is a fragmentary plan view showing the reciprocating platform and trigger stop.

Referring first to Figures 1, 2 and 7, the numeral 1 represents the ram of a press, to the underside of which is secured a tool mounting plate or block 2 forming the upper part of a die set, the lower part of which is constituted by a stationary tool mounting plate or block 3. Guide pins 4 slidably received in suitable bushings 5 maintain accurate register between the upper and lower members 2 and 3 of the die set.

Mounted on the lower plate 3 of the die set is a stripper box 6 having a feed passage therethrough shaped to correspond to the cross section of a length of extruded stock 7. As best seen in Figure 2 associated with the stripper box is a clamp 8 slidably mounted through the rear wall of the stripper box 6 to move at right angles to the direction of the stock feed into and out of engagement with the stock 7. A spring 9 normally maintains the clamp 8 in a retracted position to allow feed of the stock, either manually or by any automatic feed desired through the stripper box with the ram 1 raised.

Mounted on the upper tool mounting plate 2 on shoulder bolts 10 are cams 11 urged forwardly by relatively heavy springs 12 (one cam and spring only being shown in Figure 2) and these cams 11 are adapted to contact the clamp 8 through the engagement of the camming surfaces 13 and 14 to force the clamp 8 towards the front of the press against the stock 7 to clamp the stock in the stripper box.

The upper plate 2 also carries a piercing die or punch 15 which operates through a suitable opening 16 in the stripper box 6 to effect piercing of the stock on descent of the ram. Also mounted on the upper plate 2 of the die set is a cut off die or punch 17 which has a recess 18 shaped to the cross sectional form of the extruded stock 7. Mounted below the cut off die 17 on the lower plate 3 of the die set is a reciprocal platform 19 shown in plan in Figure 12 and shown in section particularly in Figures 3 to 5.

This platform 19 is vertically guided by suitable pins 20, some of which may be in the form of shoulder screws as shown in Figure 1 with the heads 21 thereof operating in enlarged bores 22 in the lower plate 3 to limit upward movement of the platform 19 to a position immediately beneath the bottom of the end of the stock 7 being fed through the stripper box 6. The platform 19 is urged upwardly to its limit position by suitable springs 23. Mounted on a plate 24 beneath the lower die set plate 3 is a reciprocal tapping device 25 comprising a reversible driving motor 26 and a tapping head 27 carrying a tapping element or tap 28.

The tapping device 25 is carried on a cross head 29 secured to sleeves 30 slidably mounted on pins 31 carried by and depending from the plate 24. Springs 32 act to urge the tapping device upwardly to bring the sleeves 30 into engagement with the under side of the plate 24, as shown in Figure 1.

The lower plate 3 of the die set has a suitable opening 33 through which the tapping head 27 operates and similarly, the platform 19 has a suitable opening 34 through which the tap 28 operates.

The operation of the tapping device 25 is to effect tapping of a pierced end of the stock 7 simultaneously with the cutting off of the stock by the cut off die 17 as hereinafter more fully described.

The control of the feed of the stock 7 is effected by means of a trigger stop 35, shown particularly in Figures 7 to 10. The trigger 35 is pivotally supported at 36 in the slotted upper end of a rotatable pin 37. A spring 38 acts on the trigger in a manner to urge the trigger and pin 37 in a clockwise direction and to urge the inner end of the trigger carrying a pin projection 39 downwardly and into an orifice 40 in the stock 7 formed therein by a previous operation of the piercing die 15. The inner end of the trigger 35 operates through an opening 41 in the stripper box 6. As the stock 7 is advanced with the trigger pin 39 in one of the orifices 40 in the stock, the trigger 35 will be swung counter-clockwise against the action of the spring 38 until it reaches a stop position as controlled by the size of the opening 41 in the stripper box.

The movement of the trigger will be adjusted so that the end of the stock 7 will project onto the platform 19 a sufficient distance to being a previously pierced orifice 40 in the stock into registration with the opening 34 in the platform 19 through which the tap 28 operates. The above described feed of the stock 7 occurs with the ram 1 of the press raised. As the ram descends to bring the piercing die punch 15 and cut off die 17 downwardly, a vertically adjustable trip bar 42 carried by the ram is adapted to engage the outer end of the trigger 35 to elevate the trigger pin projection 39 out of the orifice 40 in the stock. However, as this action occurs to clear the trigger from the stock, the piercing die 15 will be punching through the stock and will form, in addition, a positive stop against further stock feed during the piercing and cut off operation.

Following piercing and cut off, the upward movement of the ram will raise the trip bar 42 simultaneously with the retraction of the piercing and cut off dies 15 and 17, allowing the spring 38 to rotate and tilt the trigger 35 so that its pin projection 39 will enter a subsequent orifice 40 in the stock immediately such orifice is exposed through the stripper box opening 41. The trigger 35 will then function as above described to allow further feed of the stock to its limit position preparatory for the subsequent descent of the ram in the subsequent multiple operation of the apparatus.

With reference to Figures 3 to 6, the tapping operation, which occurs simultaneously with the cut off operation, will be more fully understood from the following detailed description.

As the cut off die 17 descends from the position of Figure 3 to the position of Figure 4, its first action is to clamp the end of the stock 7 against the retractible platform 19 and then to shear the end stock portion from the body of the stock which has immediately previously been fixed in the stripper box 6 by the penetration of the piercing die 15 and also by operation of the clamp 8 on the descending movement of the ram.

As the platform 19 is depressed against the action of the springs 23 in the shearing operation, the end portion of the stock and platform are advanced towards the tap 28 of the reciprocally mounted tapping device 25, the orifice 40 of the stock having been previously accurately registered with the opening 34 in the platform 19 and with the tap 28.

On further downward movement of the cut off die 17 to advance the platform 19 and end portion of the stock 7 towards the tap 28, the tap will commence its tapping operation and will automatically adjust its tapping rate to the rate of the descent of the cut off punch 17 through the action of the springs 32. Thus, as shown in Figure 6, the springs 32 allow the retraction of the tapping device 25 to compensate for the feed differential between the rate of feed of the tap 28 through the stock 7 and the rate of descent of the ram 1.

The tapping device 25, which may be any suitable commercially available tool of this type, upon operating to tap through the stock 7 automatically reverses to retract the tap 28. In the withdrawal of the tap on the upward movement of the ram 1, the springs 23 of the platform 19 provide a compensating means for compensating between the differential of tap withdrawal speed and platform elevation to prevent stripping of the tap threads in the stock 7.

To provide for lubrication of the tap 28 during the tapping operation, the cut off die 17 is formed with a central bore 43 communicating with which is a lateral bore 44, through which oil or other suitable lubricant is delivered by means of a flexible tubing 45.

The synchronizing of the speed of the tap and the press to enable the simultaneous cut off operation and tapping operation to be effected, of course, depends on the type of material from which the stock 7 is formed and the characteristics of the tapping device.

Where the stock 7 is formed from aluminum, it has been found, for example, that a flywheel press operating at 100 R. P. M. and with a stroke of 2½" gives excellent results when used with a Jarvis Model 202 tapping device having a tapping head ratio of tapping to withdrawal of 1 to 2.

It will be obvious, however, that various other equivalent apparatuses may be used to meet the particular problem encountered.

It will also be appreciated that various modifications in details and arrangements of the parts may be made without departing from the spirit of the invention as set forth in the appended claims.

What I claim as my invention is:

1. Means for simultaneously cutting off and tapping a pierced article from a length of stock comprising a platform having a stock receiving surface formed with an aperture adapted to register with the opening in a pierced piece of stock received on said surface and mounted to reciprocate perpendicular to said surface, a cut off punch reciprocally mounted to move from a position displaced from said platform towards said support surface and adapted to effect displacement of said support surface relative to a fixed stock support to cut off a piece of stock thereon and return, means for actuating said punch, a tapping device disposed on the opposite side of said support surface and mounted to reciprocate in a direction perpendicular to said support and having a reversible tapping element disposed in the path of said platform and adapted to operate through said aperture in the support surface, and means to synchronize the rate of displacement of said platform under operation of said punch to the rate of feed of said tapping element into and out of the opening in a pierced piece of stock on said platform.

2. Means for cutting off and tapping a pierced article from a length of stock in one operation comprising a stock supporting bed, a reciprocal platform disposed at the end of said bed and movable from a position aligned with said bed to a displaced position, means for clamping a length of stock on said bed with a pierced end portion of the stock disposed on the platform, said platform having an opening therethrough adapted to register with the hole in a pierced stock end disposed thereon, a punch reciprocably mounted to move into engagement with a stock end portion on the platform and displace said platform from said aligned position to shear a stock end portion and to move away from said platform, means for reciprocating said punch, a tapping device mounted on the opposite side of said platform to said punch and having a reversible tapping element disposed in the path of said platform and aligned with and adapted to operate to tap through said platform opening on displacement of said platform by said punch, said tapping device being displaceable in the direction of displacement of said platform and adapted to be displaced during tapping on displacement of said platform by said punch, and means for synchronizing rate of feed of said tapping element and rate of displacement of said platform for effecting tapping of a hole in a pierced stock end on the platform.

3. A device as claimed in claim 2 in which the means for synchronizing platform displacement and rate of tapping feed of said tapping element comprises spring means urging said platform towards said aligned position and spring means acting to resist retraction of said tapping device during tapping on displacement of said platform by said punch.

4. A device as claimed in claim 3 in which said second mentioned spring means are stronger than said first mentioned spring means.

5. Means for cutting off and tapping a pierced article from a length of stock in one operation comprising a bed along which a length of stock is adapted to be fed, a vertically reciprocable platform disposed at the end of the bed and movable from a position aligned with the bed and adapted to receive the pierced end of a length of stock being fed along the bed and a position displaced below said bed, spring means urging said platform to said aligned position, said platform having an opening therethrough to register with a hole in a pierced stock end portion disposed on the platform, means for clamping stock on said bed, with a pierced end portion on said platform, a vertically reciprocal punch disposed above said platform and movable towards said platform to engage a stock end portion thereon and displace said platform to shear such stock end portion, means for operating said punch, a vertically reciprocal tapping device mounted below said platform and having a reversible tapping element disposed in the path of said platform and aligned with and adapted to operate through said opening in said platform to tap the hole in a pierced stock end portion on the platform on downward displacement of said platform by said punch, said tapping device being adapted to be displaced downwardly during tapping on downward displacement of said platform, and spring means resisting downward displacement of said tapping device.

6. A device as claimed in claim 5 in which a piercing punch is provided adapted to pierce a stock portion adjacent a stock end portion on the platform on downward movement of said punch.

7. A device as claimed in claim 6 in which means are provided to control stock feed to bring the hole in a pierced end stock portion into registration with said platform opening.

8. In a press, a ram, a cut off die carried by said ram, a downwardly retractible platform mounted below and in cooperative relation with said cut off die, a fixed surface adjacent to said platform along which a length of stock is adapted to be fed to be projected onto said platform, means urging said platform upwardly to a limit position in alignment with said surface, said cut off die on descent of the ram being adapted to engage said platform and carry same downwardly from said limit position during cut off of a piece of stock projected onto the platform, a tapping device disposed beneath said platform and adapted to operate through an opening in said platform to tap a pierced stock end projected thereon on descent of said platform from said limit position, said tapping device being downwardly retractible from an upper limit position to accommodate descent of said platform upon descent of said ram to synchronize tapping speed and platform descent, and spring means urging said tapping device towards said limit position.

9. Pierce, tap and cut off apparatus comprising a stationary guide bed along which a length of stock is adapted to be fed, a retractible platform mounted at one edge of said bed to move vertically from an upper limit position aligned with said bed and a retracted position below said bed, spring means urging said platform to said upper limit position, said platform having an opening therethrough through which a tapping tool is adapted to operate, a vertically reciprocal ram arranged above said guide bed and platform, a piercing punch carried by said ram and disposed above said bed to pierce a piece of stock on the bed on descent of the ram, means for controlling feed of pierced stock along said bed to halt stock feed when a pierced end portion of the stock is projected onto said platform with the hole therein in register with said platform opening, a cut off die carried by said ram and disposed above said platform and adapted to cooperate with said guide bed edge to effect severance of a stock end projected on said platform on descent of said ram, said cut off die, on descent of said ram, being adapted to retract said platform against the action of said spring means to a position below said bed, a retractible tapping device including a tapping element mounted below said platform and disposed so that its tapping element is adapted to operate through said platform opening, said tapping device being displaceable vertically downwardly from an upper limit position with its tapping element adjacent to and below the upper surface of said platform with said platform at its upper limit position, and spring means urging said tapping device towards said upper limit position.

10. Apparatus as claimed in claim 9 in which said cut off die is formed with a vertical bore to receive said tapping element on descent of the ram to carry said platform below its upper limit position.

11. Apparatus as claimed in claim 9 in which a clamp is mounted on said bed and movable into and out of stock clamping position, means urging said clamp out of clamping position to allow stock feed, and means carried by said ram and acting on descent of said ram to engage said clamp and actuate same to stock clamping position.

12. Apparatus as claimed in claim 9 in which said means for controlling stock feed comprises a trigger stop device, said trigger stop device including a trigger movable horizontally in the direction of stock feed and also vertically, and having a pin projection adapted to engage in an opening formed in a length of stock being fed along said guide bed by said piercing punch, means limiting movement of said trigger horizontally, means carried by said ram for moving said trigger vertically on descent of said ram to clear said pin projection from stock on said bed, and spring means acting on said trigger to urge said trigger pin into a stock opening and to urge the trigger horizontally in a direction opposite to the direction of stock feed on said platform.

13. Automatic tap and cut off apparatus comprising a stationary guide bed along which a length of stock is adapted to be fed, a retractible platform mounted at one edge of said bed to move vertically from an upper limit position aligned with said bed and a retracted position below said bed, spring means urging said platform to said upper limit position, said platform having an opening therethrough through which a tapping tool is adapted to operate, a vertically reciprocal ram arranged above said guide bed and platform, means for controlling feed of pierced stock along said bed to halt stock feed when a pierced end portion of the stock is projected onto said platform with the hole therein in register with said platform opening, a cut off die carried by said ram and disposed above said platform and adapted to cooperate with said guide bed edge to effect severance of a stock end projected on said platform on descent of said ram, said cut off die on descent of said ram being adapted to retract said platform against the action of said spring means to a position below said bed, a retractible tapping device including a tapping element mounted below said platform and disposed so that its tapping element is adapted to operate through said platform opening, said tapping device being displaceable vertically downwardly from an upper limit position with its tapping element adjacent to and below the upper surface of said platform with said platform at its upper limit position, and spring means urging said tapping device towards said upper limit position.

14. In a press, a stationary bed, guide means mounted on said bed and along which a length of stock is adapted to be fed, a ram mounted above said bed, a piercing die carried by said ram and adapted to pierce stock on said bed, a cut off die carried by said ram, said bed having a shearing edge with which said cut off die is adapted to cooperate on descent of said ram to shear off a stock end portion projected beyond the shearing edge of said bed, a retractible platform mounted beneath said cut off die and contiguous to said bed shearing edge and movable from an upper limit position flush with the surface of said bed along which stock is fed to a position below said bed surface on descent of said ram, spring means urging said platform upwardly to said limit position, said platform having an opening therein, means for controlling feed of stock along said bed to locate a pierced stock end projected beyond said bed edge onto said platform with the pierced stock opening in registration with said platform opening, a retractible reversible tapping device including a tapping element mounted below said platform and disposed so that its tapping element is adapted to operate through said platform opening, said tapping device being displaceable vertically downwardly from an upper limit position with its tapping element adjacent to and below the upper surface of said platform with said platform at its upper limit position, and spring means urging said tapping device towards said upper limit position.

No references cited.